US011942059B2

(12) United States Patent
Saita

(10) Patent No.: US 11,942,059 B2
(45) Date of Patent: Mar. 26, 2024

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Takayoshi Saita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 493 days.

(21) Appl. No.: 16/999,240

(22) Filed: Aug. 21, 2020

(65) Prior Publication Data
US 2021/0295798 A1 Sep. 23, 2021

(30) Foreign Application Priority Data

Mar. 19, 2020 (JP) .................................. 2020-048716

(51) Int. Cl.
*G09G 5/10* (2006.01)
*G09G 5/14* (2006.01)
*G06F 3/0488* (2022.01)

(52) U.S. Cl.
CPC ................ *G09G 5/10* (2013.01); *G09G 5/14* (2013.01); *G06F 3/0488* (2013.01); *G09G 2354/00* (2013.01); *G09G 2358/00* (2013.01)

(58) Field of Classification Search
CPC .... G06F 1/1652; G06F 1/1616; G06F 1/1641; G06F 21/82; G06F 21/84; G06F 21/31; G06F 21/60; G06F 2221/032; G09G 5/14; H04L 63/08; H04L 63/105; H04L 67/306; H04L 9/32
See application file for complete search history.

(56) References Cited

U.S. PATENT DOCUMENTS

| 8,860,656 | B1* | 10/2014 | Cho ....................... G06F 1/1643 345/173 |
| 9,798,359 | B2 | 10/2017 | Seo et al. |
| 10,120,415 | B2 | 11/2018 | Seo et al. |
| 10,423,196 | B2 | 9/2019 | Seo et al. |
| 2007/0121536 | A1* | 5/2007 | Aihara ................... H04W 48/18 370/318 |

(Continued)

FOREIGN PATENT DOCUMENTS

| CN | 103077361 A | 5/2013 |
| CN | 104050422 A | 9/2014 |

(Continued)

OTHER PUBLICATIONS

Nov. 25, 2023 Office Action issued in Chinese Patent Application No. 202010927738.8.

(Continued)

*Primary Examiner* — Todd Buttram
(74) *Attorney, Agent, or Firm* — Oliff PLC

(57) ABSTRACT

An information processing device includes an openable display mechanism that displays a first screen in a first display region in a closed state and displays a second screen in a second display region having a larger area than the first display region in an open state, and a processor configured to execute a display process of lowering a visibility of the second screen when the display mechanism in the closed state changes to the open state.

19 Claims, 8 Drawing Sheets

(56) References Cited

U.S. PATENT DOCUMENTS

| | | | |
|---|---|---|---|
| 2015/0356304 A1* | 12/2015 | You | G06F 3/04842 |
| | | | 726/26 |
| 2016/0307002 A1 | 10/2016 | Zha | |
| 2017/0255036 A1* | 9/2017 | Hyun | G02F 1/133504 |
| 2017/0329943 A1* | 11/2017 | Choi | H04L 63/10 |
| 2019/0369671 A1 | 12/2019 | Seo et al. | |
| 2020/0264826 A1* | 8/2020 | Kwon | G06F 3/1423 |
| 2021/0295798 A1* | 9/2021 | Saita | G06F 3/0487 |

FOREIGN PATENT DOCUMENTS

| | | | |
|---|---|---|---|
| CN | 104735245 A | | 6/2015 |
| CN | 108932099 A | | 12/2018 |
| CN | 110022409 A | | 7/2019 |
| CN | 110708405 A | | 1/2020 |
| EP | 3352044 A1 | | 7/2018 |
| JP | 2011242452 A | | 12/2011 |
| JP | 2014150315 A | | 8/2014 |
| JP | 2017-510065 A | | 4/2017 |
| JP | 2017-130158 A | | 7/2017 |
| WO | 2018/192426 A1 | | 10/2018 |

OTHER PUBLICATIONS

Dec. 19, 2023 Office Action issued in Japanese Patent Application No. 2020-048716.

Jan. 9, 2024 Office Action issued in Chinese Patent Application No. 202010927738.7.

Screen captures from Baidu video clip entitled "Google Maps on Galaxy Fold," 2 pages, uploaded to <<https://m.baidu.com>>on Feb. 27, 2019, an abstracted version of video clip available from Internet: <<https://youtu.be/jMWobCxXfdM?si=JKpmqbCktbW0Gr6p>>.

* cited by examiner (a) FOLDED STATE
(b) UNFOLDED STATE

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-048716 filed Mar. 19, 2020.

BACKGROUND

(i) Technical Field

The present disclosure relates to an information processing device and a non-transitory computer readable medium.

(ii) Related Art

Flexible displays using technologies such as organic electroluminescence (EL) and electronic paper are being developed. Recently, mobile terminals having such flexible displays are being sold. For example, see Japanese Translation of PCT International Application Publication No. 2017-510065, Publication of European Patent Application No. 003352044, and International Publication No. 2018/192426.

A smartphone equipped with a flexible display and being foldable may achieve a width that fits into one hand in folded state, while also being capable of displaying information on a large screen comparable to a tablet in the unfolded state. Among smartphones of this type, there are smartphones capable of displaying information on a screen of smaller area in the folded state compared to the unfolded state. For example, a certain model of foldable smartphone having a large primary display screen on the inner side of the fold in the folded state also has a smaller sub-display on the face positioned on the outer side of the fold in the folded state. Also, a certain model of foldable smartphone having a large primary display on the outer side of the fold displays information in the half of the folded primary display that faces the user in the closed state. Furthermore, in these models of smartphones, the operation of the screen display is linked to the folded state and the unfolded state. For example, in these smartphones, when the foldable screen is unfolded, the same app had been displayed on the small half-size screen in the folded state is displayed on the larger full-size screen.

In addition, in the device described in Japanese Unexamined Patent Application Publication No. 2017-130158, when a foldable touch panel is unfolded to a flat state, the device displays a user interface (hereinafter referred to as a UI) screen on the entire touch panel. Furthermore, when the touch panel is folded by a certain angle, a software keyboard is displayed on one half of the touch panel while a UI screen is displayed on the remaining half, thereby providing a use case similar to a laptop PC.

SUMMARY

When a display mechanism in a closed state is changed to an open state, because a large image is suddenly displayed on a large screen, there is an increased risk of an information leak caused by a third party peeping the larger opened screen compared to a device with a smaller closed screen. For example, when the display mechanism changes from the closed state to the open state and an app screen that had been displayed on the small screen in the closed state is displayed on the large screen in the open state, information may be displayed at a larger size compared to the small screen, or items that were not displayed on the small screen may be additionally displayed.

Aspects of non-limiting embodiments of the present disclosure relate to reducing the degree of leakage of displayed content on a second screen when a display mechanism changes from a closed state to an open state compared to a case where the second screen to be displayed in the open state is displayed without controlling the display of the second screen.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including an openable display mechanism that displays a first screen in a first display region in a closed state and displays a second screen in a second display region having a larger area than the first display region in an open state, and a processor configured to execute a display process of lowering a visibility of the second screen when the display mechanism in the closed state changes to the open state.

BRIEF DESCRIPTION OF THE DRAWINGS

An exemplary embodiment of the present disclosure will be described in detail based on the following figures, wherein.

DETAILED DESCRIPTION

Figure 1A:
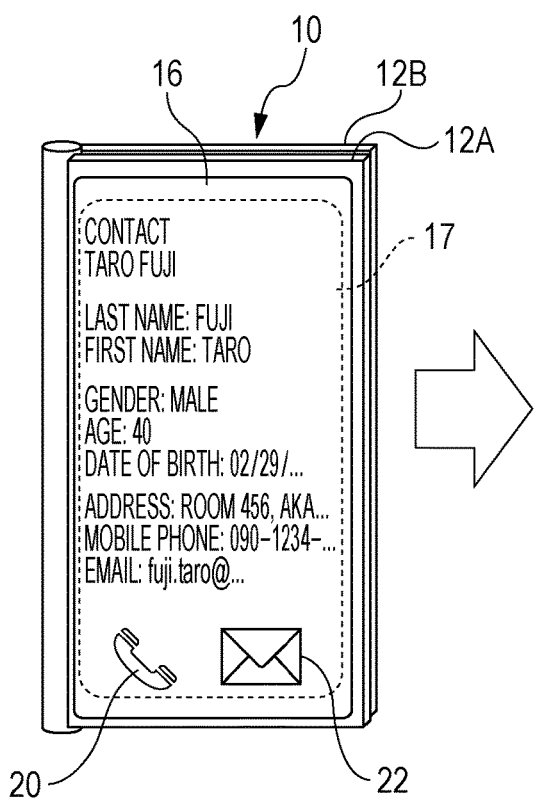
FIGS. 1A and 1B are diagrams for explaining display control according to the related art of a foldable information processing device.
Figure 1B:
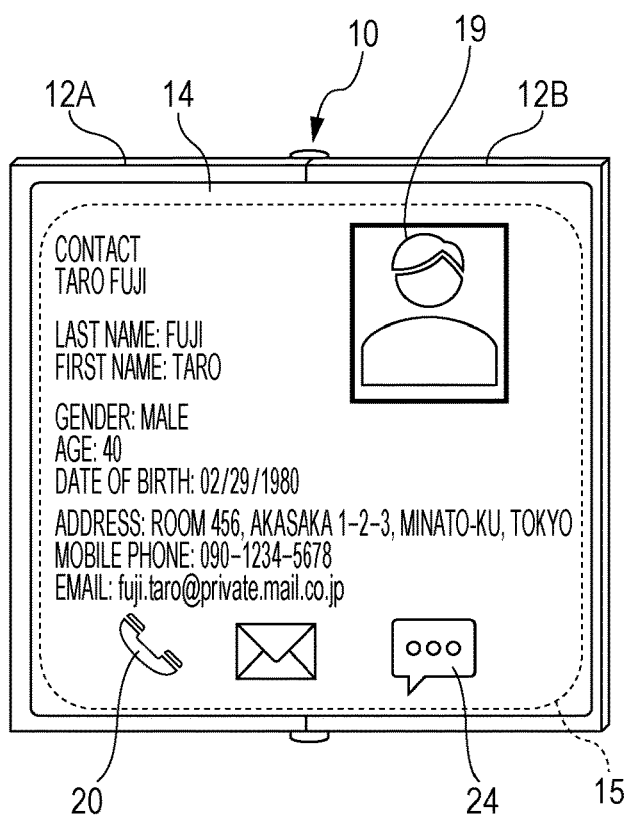

FIGS. 1A and 1B will be referenced to describe an example of display control according to the related art of an information processing device 10 that is provided with a large, flexible display and is foldable in two. As an example, the information processing device 10 is a mobile information terminal (such as a smartphone or a tablet, for example), but is not limited thereto.

The information processing device 10 exemplified in FIGS. 1A and 1B is provided with a first body 12A and a second body 12B that are openably joined to each other. The surfaces on one side of the first body 12A and the second body 12B are provided with a flexible primary display 14 spanning the two bodies. The primary display 14 has a display region of an area nearly equal to the combined area of the surfaces of both the first body 12A and the second body 12B. Also, in this example, a sub-display 16 is provided on the surface on the other side of the first body 12A where the primary display 14 is not provided. The sub-display 16 has an area that fits inside the surface of the first body 12A, and has a display region smaller than the primary display 14. Additionally, the sub-display 16 does not have to be flexible. The primary display 14 and the sub-display 16 are configured as touch panel displays, for example. In this example, the structure that includes the primary display 14 and the sub-display 16 as well as the first body 12A and the second body 12B that support the displays corresponds to a foldable display mechanism.

FIG. 1A illustrates the information processing device 10 in the folded state, which corresponds to a "closed state" in this embodiment, while FIG. 1B illustrates the information processing device 10 in the unfolded state, which corresponds to an "open state" in this embodiment.

The folded state refers to a state in which the display mechanism is folded enough that the display region of the primary display 14 is not sufficiently visible from the outside. In the folded state, the display region of the primary display 14 is not sufficiently visible from the outside of the information processing device 10, but instead, the display region of the sub-display 16 is easily visible. In the folded state illustrated in the example of FIG. 1A, the surfaces on the primary display 14 side of the first body 12A and the second body 12B are touching each other or are nearly close enough to touch each other. In this state, the angle obtained between the planes of the primary display 14 on the first body 12A side and the second body 12B side (in other words, the opening angle of the display mechanism) is substantially 0 degrees. Note that the case of the opening angle being substantially 0 degrees is merely one example of prescribing the folded state. Alternatively, a threshold value greater than 0 degrees may be decided, and the case where the opening angle is inside the range from 0 degrees to the threshold value may be prescribed as the folded state.

The unfolded state is a state in which the display mechanism is unfolded enough that the display region of the primary display 14 is sufficiently visible. In the unfolded state, the display region of the sub-display 16 is not sufficiently visible from the outside of the information processing device 10, but instead, the display region of the primary display 14 is easily visible when the primary display 14 faces a user of the device 10. As an example, the diagram illustrates the state where the display mechanism is unfolded 180 degrees as the unfolded state, but this is merely one example. For example, a second threshold value less than 180 degrees may be decided, and the case where the opening angle is inside the range from the second threshold value to 180 degrees may be prescribed as the unfolded state.

When the display mechanism is in the folded state, the information processing device 10 displays a screen in the display region of the sub-display 16. In the folded state, the screen display in the display region of the primary display 14 may be stopped displaying. Conversely, when the display mechanism is in the unfolded state, the information processing device 10 displays a screen in the display region of the primary display 14. In the unfolded state, the screen display in the display region of the sub-display 16 may be stopped displaying.

The sub-display 16 is an example of a first display region where a first screen is displayed in the folded state, while the primary display 14 is an example of a second display region where a second screen is displayed in the unfolded state, the second display region being larger than the first display region.

In the example illustrated in the diagram, a screen 17 presenting information about a contact generated by a contacts app is displayed on the sub-display 16 in the folded state. On the screen 17, information such as the name, address, and phone number of the contact is displayed, and icons such as an icon 20 for calling a phone app and an icon 22 for calling an email app are displayed. From this state, if the user unfolds (or opens) the display mechanism into the unfolded state, the information processing device 10 starts the display on the primary display 14. At this time, a screen 15 presenting information about the same contact in the same contacts app as the screen 17 that had been displayed in the folded state is displayed on the primary display 14. Here, because the display region of the primary display 14 has a larger screen size than the display region of the sub-display 16, the program of the app is configured to display more displayed content on the screen 15 compared to the screen 17. For example, in addition to the displayed content that had been displayed on the screen 17, information that had not been displayed on the screen 17, such as an image 19 of a profile photo of the contact and an icon 24 for calling a social media network (also referred to as a social networking service (SNS)) app, is displayed on the screen 15. The screen 15 of the app displayed on the primary display 14 corresponds to a first screen, and the image of the screen 15 (an image containing text strings, an image of a profile photo, and an icon group, for example) corresponds to first displayed content that is displayed on the first screen. Also, the screen 17 displayed on the sub-display 16 corresponds to a second screen, and the image of the screen 17 corresponds to second displayed content that is displayed on the second screen.

Note that in this specification, an app refers to an application program executed by the information processing device 10.

Figure 2:
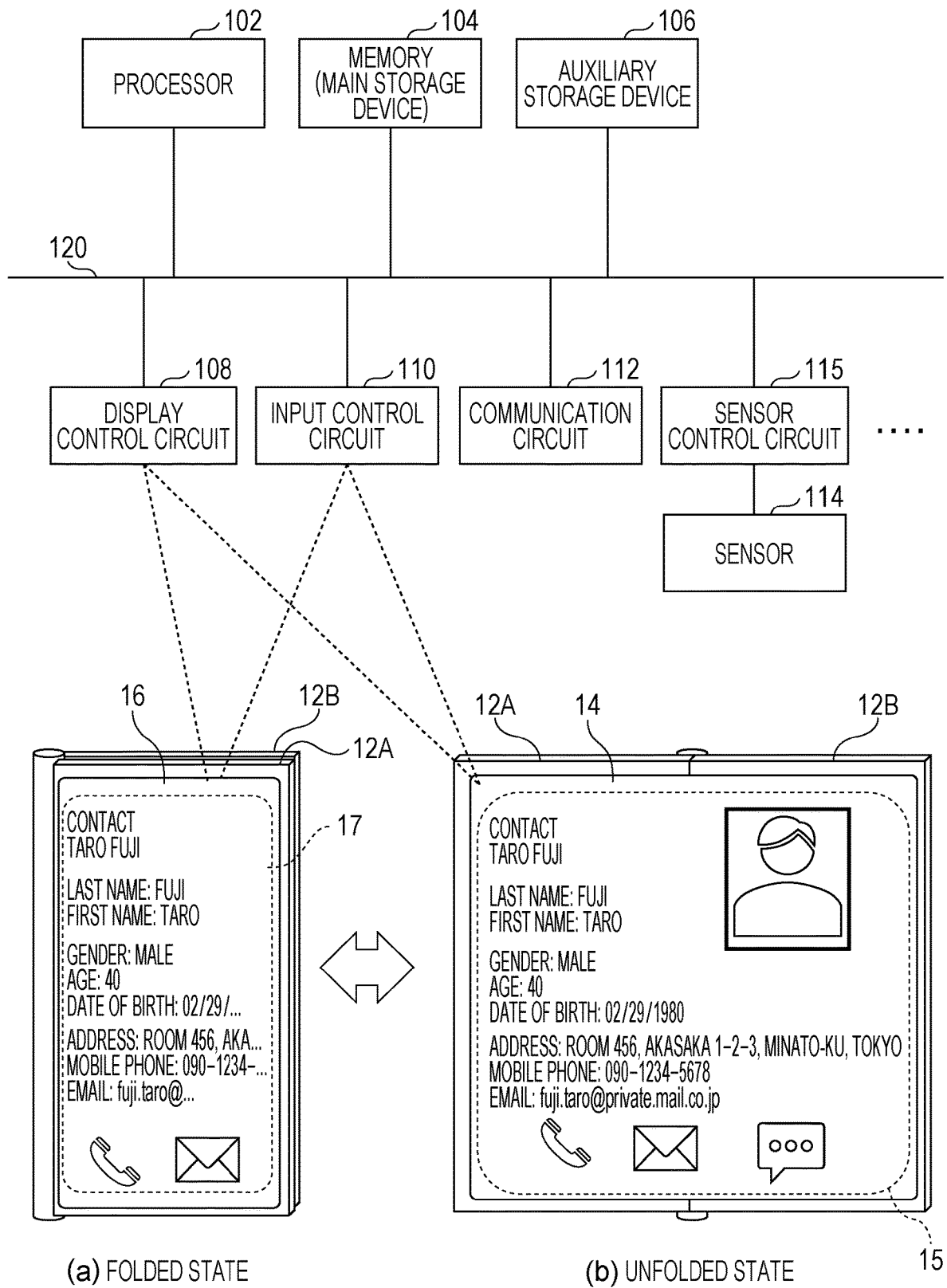
FIG. 2 is a diagram illustrating an example of a hardware configuration of an information processing device.

FIG. 2 illustrates an example of the major parts of a hardware configuration of the information processing device 10. The hardware configuration includes components included in an ordinary computer, such as a processor 102, memory 104 such as random access memory, an auxiliary storage device 106 such as flash memory, a display control circuit 108, and an input control circuit 110. Additionally, components such as a communication circuit 112 and a sensor 114 for detecting the unfolded or folded state of the display mechanism are also included. In the example illustrated in the drawing, the processor 102, the memory 104, the auxiliary storage device 106, the display control circuit 108, the input control circuit 110, the communication circuit 112, and a sensor control circuit 115 that controls the sensor 114 are connected to a bus 120. Through the bus 120, the processor 102 exchanges data with the memory 104, the auxiliary storage device 106, the display control circuit 108, the input control circuit 110, the communication circuit 112, and the sensor control circuit 115. Note that in the example of FIG. 2, all of the components from the processor 102 to the sensor control circuit 115 are connected to the same bus 120 in a flat configuration, but this is merely one example. Alternatively, a hierarchical structure is also possible in which some of the components (for example, a component group including the processor 102) are integrated into a single chip, such as a system-on-a-chip (SoC) for example, and the remaining component group is connected to an external bus connected to the chip.

The processor 102 herein refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

Also, the processor 102 is broad enough to encompass one processor or plural processors in collaboration which are located physically apart from each other but may work cooperatively. The order of operations of the processor 102 is not limited to one described in the embodiment below, and may be changed.

The display control circuit 108 controls the screen display on the primary display 14 and the sub-display 16. The input control circuit 110 detects and processes touch input with respect to the touch panels provided in the primary display 14 and the sub-display 16, and conveys the processing result to the processor. The communication circuit 112 executes signal processing by which the information processing device 10 communicates with an external network device by wireless communication or the like.

The sensor 114 for detecting the unfolded or folded state of the display mechanism may be a Hall effect sensor, for example. In this case, one of the first body 12A and the second body 12B is provided with a magnet while the other is provided with the Hall effect sensor, such that when the magnet and the Hall effect sensor approach each other as a result of the display mechanism being folded, the Hall effect sensor detects the magnetism and detects that the display mechanism is in the folded state. However, the sensor for detecting the unfolded or folded state of the display mechanism is not limited to a Hall effect sensor. Any of various types of sensors used in the related art to detect the unfolding or folding of a foldable device may be used as the sensor 114. For example, various sensors such as an infrared sensor, an illuminance sensor, an acceleration sensor, a gyro sensor, and a proximity sensor may be used.

Also, the information processing device 10 may have built-in output devices such as a speaker and a vibration mechanism.

In the display control of the related art, when the display mechanism in the folded state changes to be unfolded, the screen 15 containing more information corresponding to the screen 17 that had been displayed in the display region of the sub-display 16 in the folded state is immediately displayed on the primary display 14. However, with this arrangement, displayed content that the user using the information processing device 10 was not expecting when the user was looking at the display of the screen 17 in the folded state (for example, the image 19 of the profile photo) is suddenly displayed, and there is a possibility that such displayed content may be seen by a third party.

Also, if an image that was being displayed on the sub-display 16 is displayed in a large size on the primary display 14 when the display mechanism is unfolded, the image is more easily peeped by a third party, and therefore the risk of an information leak increases.

Accordingly, in the exemplary embodiment, when the display mechanism changes from the folded state to the unfolded state, the information processing device 10 executes a display process (hereinafter referred to as a "shielding process") that lowers the visibility of the screen displayed in the display region of the primary display 14.

Figure 3A:
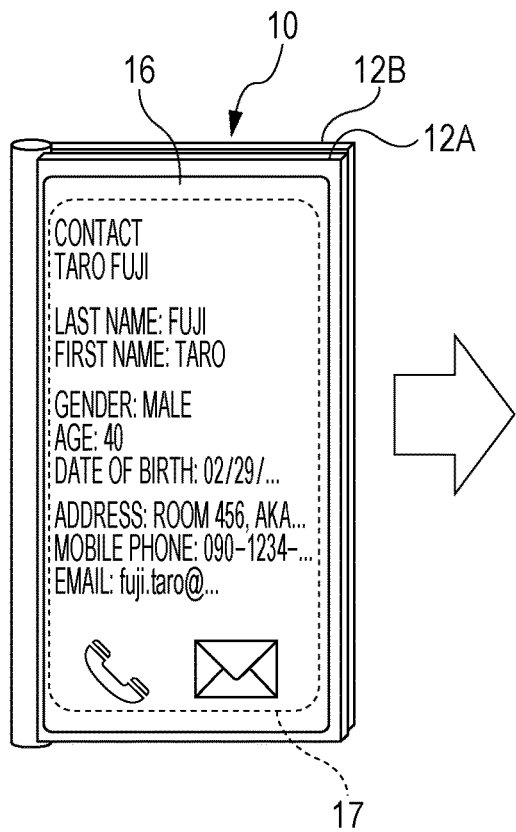
FIGS. 3A and 3B are diagrams for explaining display control of a foldable information processing device according to an exemplary embodiment.
Figure 3B:
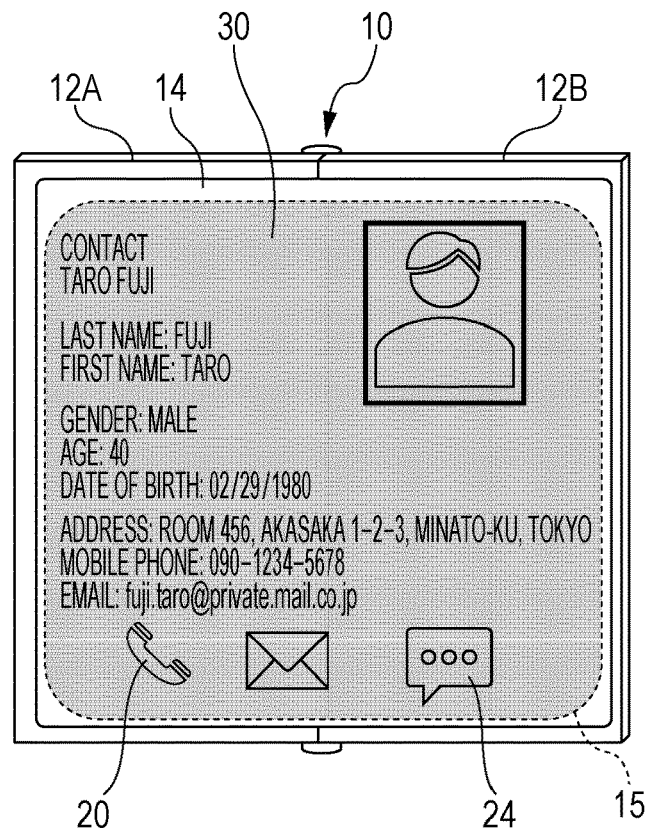

As illustrated in FIGS. 3A and 3B, for example, the shielding process superimposes (that is, overlays) a shielding image 30 onto the screen 15 to display in the display region of the primary display 14. In this example, the shielding image 30 is a translucent image that covers the entirety of the screen 15. The shielding image 30 is an image that lowers the visibility of the image onto which the shielding image 30 is superimposed (that is, the image in the layer underneath the shielding image 30). The shielding image 30 may be a uniform image of a single color, but may also include a pattern for increasing the difficulty of peeping. The user is able to see through the superimposed shielding image 30 and look at the screen 15 underneath. However, because the contrast of the displayed content on the screen 15 is lowered due to being covered by the shielding image 30, a person attempting to peep will have more difficulty seeing the displayed content compared to a case in which the displayed content is not covered by the shielding image 30.

In this way, in the example of FIG. 3B, by displaying the shielding image 30 in the display region of the primary display 14, there is a lower risk of an information leak from the primary display 14 when the display mechanism changes from the folded state to the unfolded state. In this example, a situation where an item (for example, the image 19 of the profile photo) that had not been displayed on the screen 17 when the display mechanism was in the folded state is displayed suddenly (that is, without giving the user time to take appropriate measures) on the screen 15 after the display mechanism changes to the unfolded state is avoided, for instance.

Conditions related to the display of the shielding image 30 when the display mechanism changes from the folded state to the unfolded state may also be settable.

Here, the conditions related to display include a condition that stipulates whether or not to display the shielding image 30 when the display mechanism changes from the folded state to the unfolded state, for example. The condition stipulates whether or not to display the shielding image 30 according to one or more conditions such as the location of the device, time, the app being displayed on screen in the folded state, the type of communication, and a measurement result regarding the state of the surroundings.

Of these, with regard to location, a place in which to display the shielding image 30, a place in which not to display the shielding image 30, or both may be settable, such that the shielding image 30 is not displayed inside the home and is displayed outside the home, for example. Note that "place" herein refers to the location (that is, the geographical position) where the information processing device 10 exists. For example, a place in which to display the shielding image 30 (that is, the shielding image 30 is displayed in the case where the information processing device 10 is positioned in that place) may be set, and the shielding image 30 may be configured not to be displayed in places other than the set place. Conversely, a place in which not to display the shielding image 30 may be set, and the shielding image 30 may be configured to be displayed in places other than the set place.

Also, with regard to time, a time period during which to display the shielding image 30, a time period during which not to display the shielding image 30, or both may be settable, such that the shielding image 30 is displayed during the day (for example, the time period from 9:00 am to 5:00 pm) and is not displayed at night, or in other words, in a time period other than during the day.

Also, with regard to the app being displayed on screen in the folded state, a condition that specifies an app for which to display the shielding image 30, a condition that specifies an app for which not to display the shielding image 30, or both may be settable. Here, the condition that specifies an app for which to display the shielding image 30 may specify individual apps for which the shielding image 30 is to be displayed, for example. Also, in the case where apps are categorized, a condition that specifies a type of app for which to display the shielding image 30 may be settable. For example, it is conceivable to set a condition such that the shielding image 30 is not displayed in the case of an app belonging to a game category, but is displayed in the case of an app used for banking.

Also, in the case of an app that may possibly display personal information or secret information, the demand for displaying the shielding image 30 may be considered to be high. Accordingly, a predetermined determination program may determine whether or not personal information or secret information is included among the displayed content on a screen generated by an app currently being executed by the information processing device 10, and in the case of determining that personal information or secret information is included, the shielding image 30 may be displayed when the display mechanism changes to the unfolded state. The displayed content subject to the determination may be displayed content on the sub-display 16 in the folded state, displayed content on the primary display 14 in the unfolded state, or both. For example, it may be determined whether or not personal information or secret information is included in one or more items that are not displayed in the folded state but are displayed in the unfolded state among the displayed content of an app, and the shielding image 30 may be displayed if such information is included, whereas the shielding image 30 may not be displayed if such information is not included. The determination program may be executed by the information processing device 10 or by a server on a network. The exemplary embodiment may use one of various known determination programs, such as a method that determines whether or not a specific string or specific attribute data is included on a screen displayed in the display region of the primary display 14, for example. Additionally, personal information or secret information to search for from the displayed content in the determination may also be settable by the user. For example, personal information or secret information to search for may be settable as a class of items in the displayed content, such as personal names, monetary amounts, and images of faces, or may be settable as a specific character string, such as "company secret".

Also, among the conditions related to display, conditional items related to the type of communication may stipulate whether to display or not display the shielding image 30 depending on what type of communication the information processing device 10 is using to communicate with an external device. For example, a list of networks for which the display of the shielding image 30 is not needed, or in other words a whitelist, may be settable. For example, if the network that the information processing device 10 is currently connected to is a network on the whitelist, when the display mechanism changes from the folded state to the unfolded state, the screen 15 is displayed on the primary display 14 without the shielding image 30. On the other hand, if the currently connected network is not a network on the whitelist, the shielding image 30 is displayed on top of the image of the screen 15 to display on the primary display 14. Instead of a whitelist, a blacklist (that is, a list of networks for which the display of the shielding image 30 is desirable) may also be settable. Note that it is sufficient to specify which network the information processing device 10 is currently connected to according to information such as the identification information of a wireless access point that the information processing device 10 is connected to, for example.

Also, among the conditions related to display, conditional items related to a measurement result regarding the state of the surroundings may stipulate whether to display or not display the shielding image 30 depending on the state of the surroundings that the information processing device 10 detects around itself. For example, the shielding image 30 may be displayed in the case where a third party (that is, a person other than the user of the information processing device 10) is present near the information processing device 10. To determine whether or not a third party is present near the information processing device 10, it is sufficient to use information such as sound detected by a microphone built into the information processing device 10, an image taken by a built-in camera, or information about the presence or absence of a nearby terminal that the information processing device 10 has detected through short-range communication such as Bluetooth (registered trademark) or proximity communication such as Near Field Communication technology (NFC), for example.

The multiple conditional items regarding location, time, app, and the like illustrated in the above examples may be used individually or in predetermined combinations with each other to determine whether or not to display the shielding image 30. For example, the shielding image 30 may be displayed only if the conditions for displaying the shielding image 30 are satisfied for all items preselected from among location, time, app, and the like (in other words, an AND condition). Alternatively, the shielding image 30 may be displayed if the conditions for displaying the shielding image 30 are satisfied for at least one preselected item (in other words, an OR condition). How the final determination result about whether or not to display the shielding image 30 is to be computed from the combination of the determination results of individual conditional items (for example, the AND condition or the OR condition described above) may be settable for the information processing device 10 by the user, for example.

Also, the content of the conditions related to position, time, communication method, and the like may be individually settable for each app or each category of app.

Additionally, the conditions related to the display of the shielding image 30 may also include conditions that stipulate different aspects related to display other than the conditions stipulating whether or not to display the shielding image 30 described so far. For example, the conditions related to the display of the shielding image 30 may include conditions that stipulate the properties of the shielding image 30 to display, such as transparency level, density, color, and display duration. For example, the properties of the shielding image 30 may be settable according to an item described above, such as position, time, and app, or according to multiple predetermined combinations of the items described above.

The function of controlling the display of the shielding image 30 when changing from the folded state to the unfolded state may be incorporated into an operation system (OS) that controls the information processing device 10, or a security app that fulfills such a function may be prepared.

Figure 4:
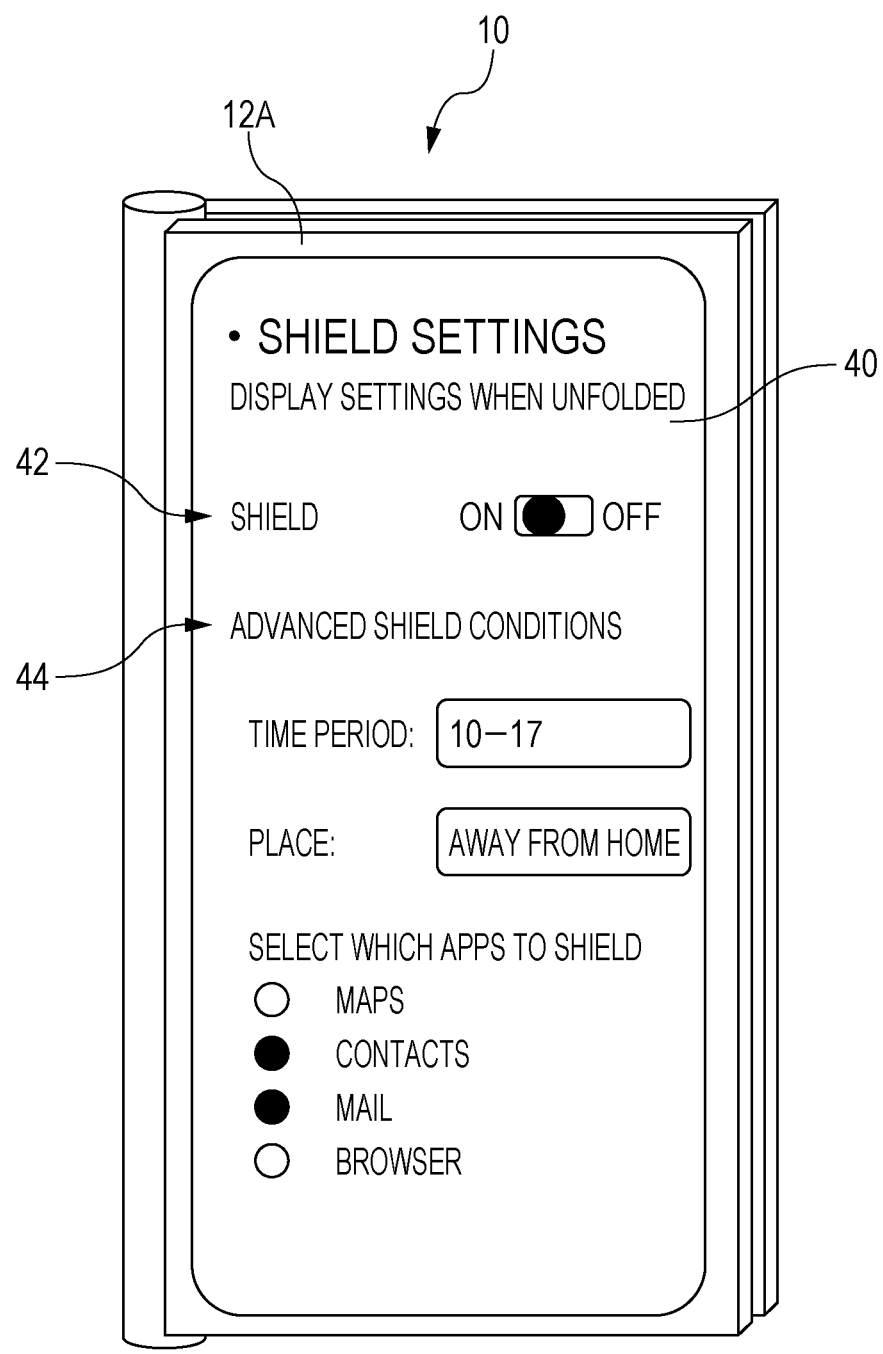
FIG. 4 is a diagram illustrating an example of a settings screen for modifying the display settings of a shielding image.

The conditions related to display described above are set by opening a predetermined settings screen. FIG. 4 illustrates one example of such a settings screen 40. On the settings screen 40, the shielding image 30 is referred to as the "shield". The settings screen 40 includes a basic setting field 42 the turns on (that is, activates) or turns off (that is, deactivates) the shield function itself (in the diagram, the activated state is labeled ON while the deactivated state is labeled OFF), and an advanced condition setting field 44 for the case where the shield function is turned on.

In the case where OFF is selected in the basic setting field 42, the shield display is deactivated. In other words, the shield, that is, the shielding image 30, is not displayed even if the display mechanism changes from the folded state to the unfolded state.

In the case where ON is selected in the basic setting field 42, whether or not to display the shield is determined in accordance with the set content of each conditional item in the advanced condition setting field 44. In the example of FIG. 4, the setting field 44 includes a UI for receiving a specification of a "time period" during which to display the shield, a geographical "place" of the information processing device 10 where the display of the shield is to be executed, and one or more apps for which to display the shield. In the example illustrated in the diagram, the shield is displayed in the case where the current time is inside a time period from 10:00 am to 5:00 pm, the information processing device 10 is positioned in a location other than a preregistered "home", and the app being displayed on the sub-display 16 is "Contacts" or "Mail".

The illustration in FIG. 4 is an example of a settings screen 40 displayed on the sub-display 16 when the display mechanism is in the folded state, but a similar settings screen may also be displayed on the primary display 14 and settings may be received from the user when the display mechanism is in the unfolded state. It is sufficient to call the settings screen 40 using UI technology of the related art, such as by performing a swipe gesture from an edge of the screen, or tapping an icon for calling the settings screen displayed on the screen.

Figure 5:
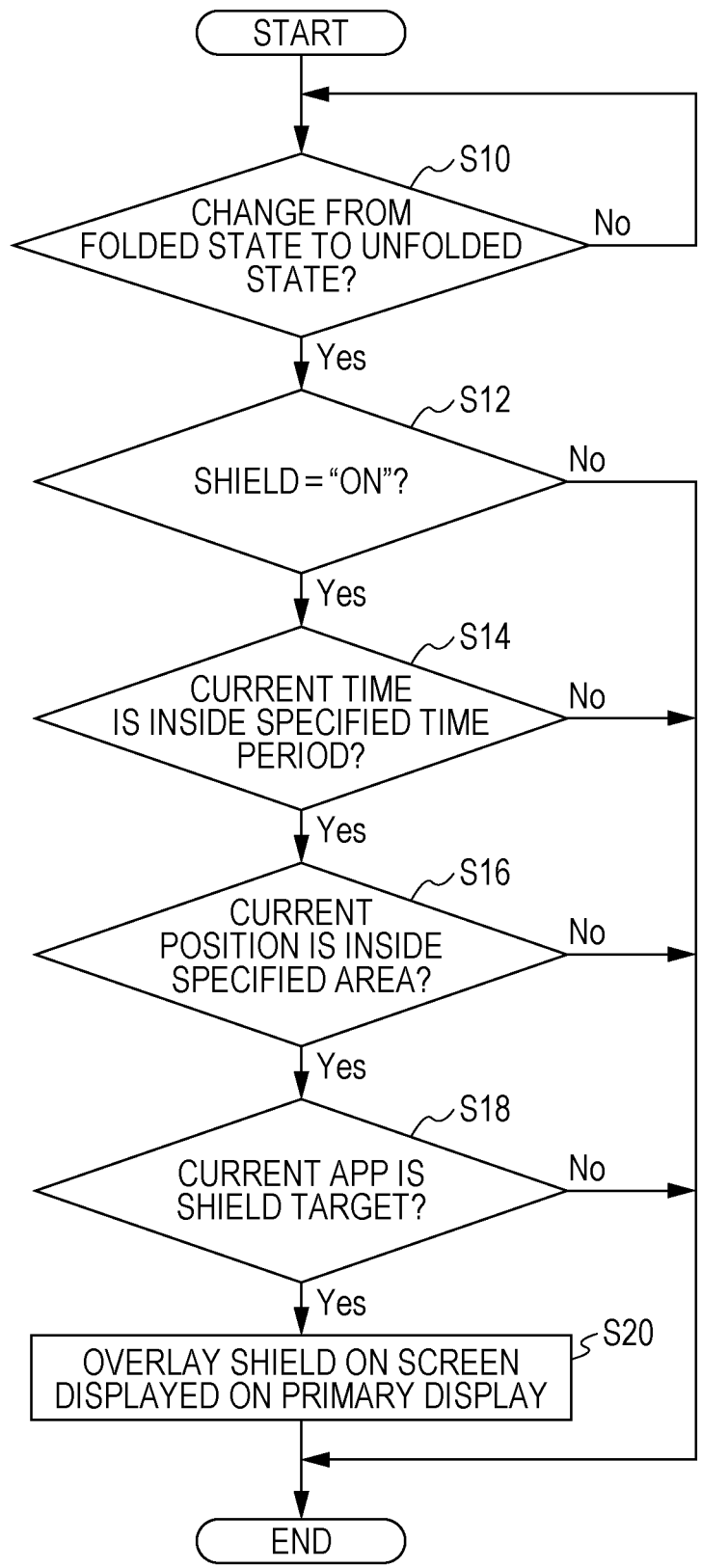
FIG. 5 is a diagram illustrating an example of a processing sequence executed by the information processing device.

FIG. 5 illustrates an example of a processing sequence by the information processing device 10 for controlling the display of the shield according to the settings on the settings screen 40 in FIG. 4. In this sequence, the information processing device 10 monitors the occurrence of an event indicating that the display mechanism has changed from the folded state to the unfolded state (S10). In the case where such an event occurs, the information processing device 10 determines whether or not the setting in the basic setting field 42 is "ON" (S12). If the result of the determination is No, the processing sequence ends without displaying the shield. If the result of the determination in S12 is Yes, the information processing device 10 determines whether the current time is inside the set time period (S14), whether the current position of the information processing device 10 satisfies the set position condition (in the illustrated example, a place other than "home") (S16), and also whether the app currently being display on the sub-display 16 corresponds to a target app to shield (S18). Next, if the results of these determinations are all Yes, the shield is displayed superimposed onto the screen 15 to display on the primary display 14 (S20). If even one of the determination results in S14, S16, and S18 is No, S20 is skipped, and the processing sequence ends.

In the sequence in FIG. 5, in the case where the display mechanism changes from the folded state to the unfolded state while OFF is selected in the basic setting field 42 of the settings screen 40 in FIG. 4, the information processing device 10 simply displays the screen 15 of the app in the display region of the primary display 14, irrespectively of whether or not the advanced conditions indicated in the setting field 44 are satisfied. However, this is merely one example. As another example, in the case where the display mechanism in the folded state is unfolded in such a situation, or in the case where an unfolding movement is detected, it may be checked whether or not the advanced conditions are satisfied, and if satisfied, a warning process may be performed. The warning process may output a warning sound, execute a process causing the information processing device to vibrate using a vibration mechanism, cause an indicator such as a warning light provided on the information processing device 10 to turn on or blink, display a warning on the sub-display 16 or the primary display 14, or perform a combination of the above.

A UI for setting the display state of the shield, that is, the shielding image 30, may also be displayed inside the shielding image 30 or together with the shielding image 30.

Figure 6:
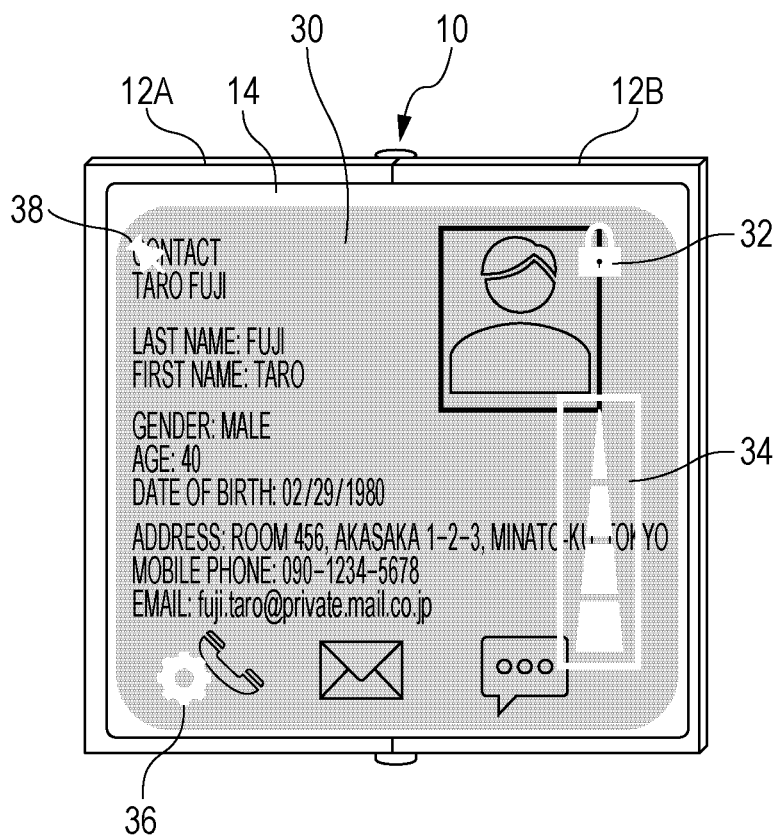
FIG. 6 is a diagram illustrating an example of a shielding image that includes a user interface (UI) for modifying the display settings.

FIG. 6 illustrates an example of such a UI.

On the UI illustrated as an example, a "padlock" icon 32 is used to receive an instruction for toggling the shielding image 30 on and off. In the case where the shielding image 30 is on, or in other words displayed, the icon 32 has a specific appearance, such as the appearance of a "locked padlock" for example. If the user uses a finger to tap the icon 32 with this appearance, the shielding image 30 is turned off, or in other words is not displayed (or the transparency level is set to 100%), and the icon 32 takes a different specific appearance, such as the appearance of an "unlocked padlock" for example. If the user taps the icon 32 in this state, the shielding image 30 is turned on.

A transparency level adjustment bar 34 illustrated below the icon 32 is used to receive adjustments to the transparency level of the shielding image 30. In this example, the transparency level is adjustable in four stages, and the value of the transparency level is indicated according to how many of the four segments are being displayed from the top. For example, the transparency level is the highest when all four segments are being displayed, and the transparency level is the lowest when only one segment is being displayed.

An icon 36 illustrated in the lower-left corner of the shielding image 30 is for calling a settings screen for configuring advanced settings regarding the shielding image 30.

A pin-shaped icon 38 illustrated in the upper-left corner of the shielding image 30 is an icon for receiving an instruction to pin the shielding image 30. Although omitted from illustration, the icon 38 has two states of on and off, and the display appearance (for example, the display color) of the icon 38 is distinguished between on and off. The icon 38 is toggled on and off by tapping the icon 38. When the icon 38 is turned on, the shielding image 30 is pinned in the current state. In other words, although it is possible to cause the shielding image 30 to move or change in size by performing touch operations on the primary display 14, when the icon 38 is in the on state, such operations for moving and changing size are not received. Conversely, when the icon 38 is in the off state, operations for moving and changing the size of the shielding image 30 are received. In the case where the user wants to change the size or position of the shielding image 30 displayed in the display region of the primary display 14 when the display mechanism is unfolded, the user sets the icon 38 to the off state if appropriate, and then changes the size or position of the shielding image 30 displayed inside the display region by performing a gesture on the touch panel. Additionally, in the case where the user wants to pin the shielding image 30 at the changed size and position, the user taps the icon 38 to set the on state.

Figure 7:
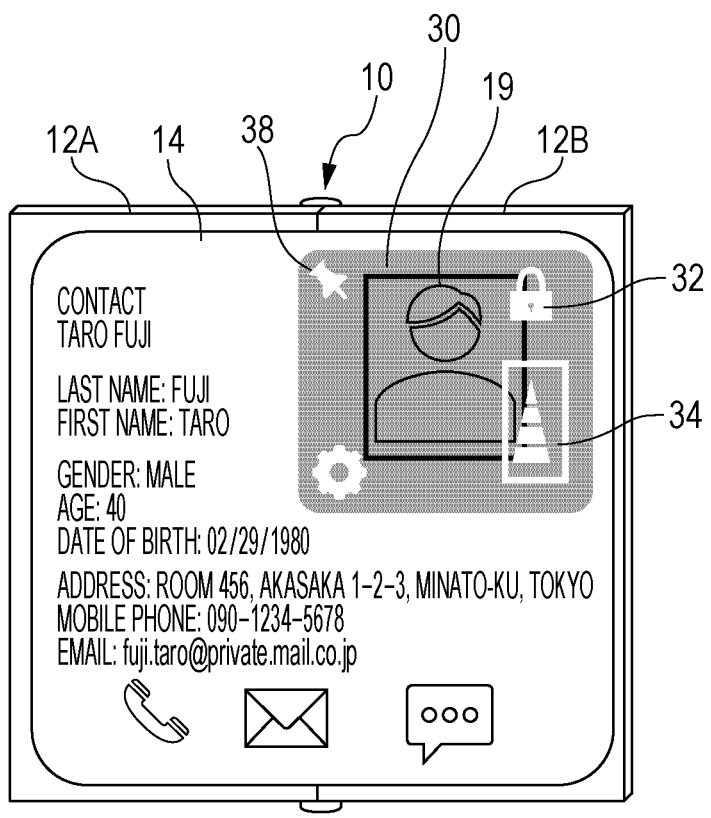
FIG. 7 is a diagram illustrating an example of a shielding image that is reduced in size and pinned in position.

The pinning of the shielding image 30 by turning on the icon 38 may be treated not as a pinning with respect to the primary display 14, but as a pinning with respect to the displayed content displayed on the primary display 14. If the displayed content displayed on the screen of the primary display 14 is moved by a scroll operation, the shielding image 30 moves in the same way to match the movement. For example, assume that as a result of the user reducing or moving the shielding image 30 on the screen in the state illustrated in FIG. 6, the shielding image 30 is changed to a state that shields only the image 19 of the profile photo on the screen as exemplified in FIG. 7, and the shielding image 30 is pinned in this state with the icon 38. Thereafter, if the user scrolls the screen and the displayed content including the image 19 moves, the shielding image 30 also moves in a similar way, and keeps covering the image 19.

Note that pinning the shielding image 30 with respect to the displayed content in this way may be limited to cases where the shielding image 30 covers a portion of the screen on the primary display 14. In this case, if the shielding image 30 is pinned while in a state of covering the entire region of the primary display 14, even if the screen 15 of the app underneath the shielding image 30 is scrolled, the shielding image 30 continues to cover the entire screen of the primary display 14.

Note that in FIG. 6, the display state of the shielding image 30 is set by the icons 32 to 38 displayed on the shielding image 30, but instead of in addition to the above, touch gestures corresponding to each of the icons 32 to 38 may also be defined. For example, a gesture of tapping three times in quick succession may be defined as a gesture for giving a toggle instruction to pin or unpin the shielding image 30 similarly to tapping the icon 38.

In the example of FIG. 6, the shielding image 30 simply covers the entire display region of the primary display 14 uniformly, but this is merely one example. As a different example, the shielding image 30 may also be controlled according to the displayed content of the screen 15 displayed in the display region of the primary display 14.

For example, the information processing device 10 may identify only meaningful portions, such as text information and a photographic image, from the entire image displayed on the screen of the primary display 14, and generate the shielding image 30 to shield such meaningful portions more strongly than other portions. In the example illustrated in FIG. 8, the region of the image 19 of the profile photo and two regions illustrating text information related to a contact have been extracted as meaningful portions from the screen of the app displayed on the primary display 14. Additionally, these regions are covered by shielding images 30A, 30B, and 30C having a lower transparency level (that is, the visibility of the image underneath is lowered) than other regions on the screen. Note that in the illustrated example, regions other than the shielding images 30A, 30B, and 30C on the screen are also covered by the shielding image 30 having a higher transparency level, but examples in which such a shielding image 30 is not displayed are also possible.

Figure 8:
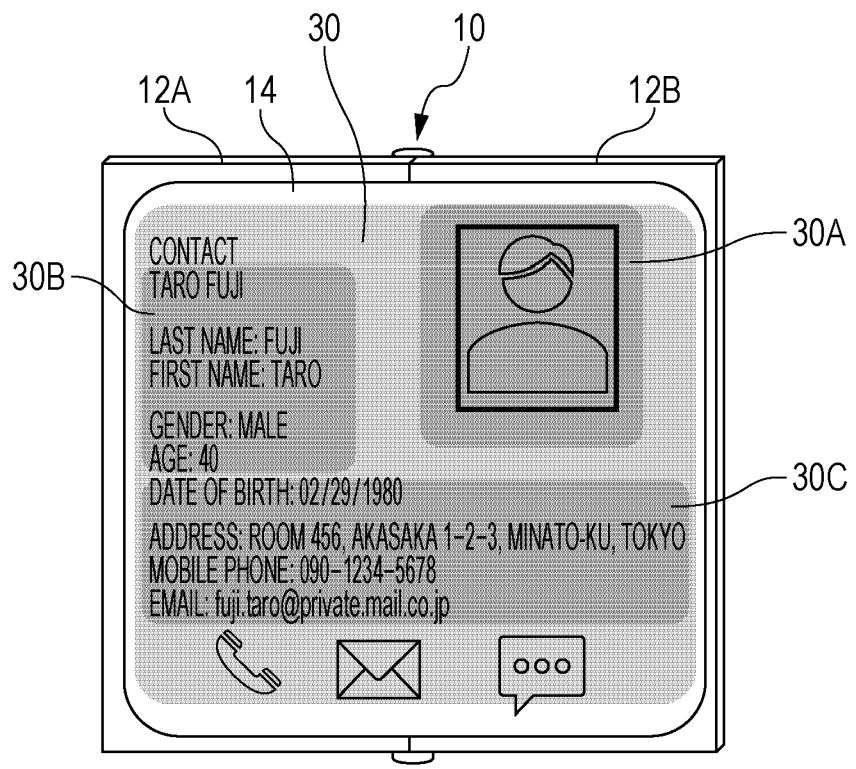
FIG. 8 is a diagram for explaining an example of controlling the shielding image according to the displayed content in different regions of the screen.

In the example of FIG. 8, the regions of text information and the region of the photographic image are covered by the shielding images 30A and 30B having the same transparency level, but this is merely one example. For example, the properties (for example, the transparency level) of the shielding image for each region may be set according to the type of displayed content in each region, such as text information and a photographic image, such that for example the shielding image 30A of the photographic image is set to a lower transparency level than the shielding images 30B and 30C of the text regions.

At this point, the dividing of the entire image displayed on the screen into regions may use a publicly available region analysis process (also referred to as picture/character analysis or the like) that analyzes features of an image of a document and distinguishes between regions such as text, photographs, and tables included in the image. Also, by analyzing the source code of each object, such as character strings and images, included in the displayed content on the screen, the type of each object may be determined and the screen may be divided into the individual objects.

Also, in addition to or instead of a region analysis process, publicly available technology may be used to determine whether or not personal information or the like is included in the content displayed in each region on the screen 15, and lower the transparency level of the shielding image that covers a region containing personal information or the like compared to the transparency level of the shielding image that covers other regions.

Also, the information processing device 10 receives input from the user with respect to the screen 15 in the state of displaying the shielding image 30 superimposed onto the screen 15 of the app being displayed in the display region of the primary display 14.

For example, in the case where a UI object that receives operations from the user exists among the displayed content on the screen 15, if the user sees the UI object through the shielding image 30 and operates the UI object with a touch operation, the information processing device 10 receives the operation. Described in terms of a specific example, in the display state of the screen 15 of the contacts app on the primary display 14 illustrated as an example in FIG. 3B, the UI icons 20 to 24 for calling apps such as a phone app are visible through the shielding image 30. If the user taps one of the icons 20 to 24 on the primary display 14 in this display state, the information processing device 10 recognizes the tap as being directed at the icon on the screen 15 underneath, and not directed at the shielding image 30. With this arrangement, the app corresponding to the icon is launched.

Also, like the example in FIG. 6, a UI (for example, the icons 32 to 38) that set the display state of the shielding image 30 may be displayed in the shielding image 30 in some cases. In such cases, if the spot that the user touches on the primary display 14 is part of the UI of the shielding image 30, the information processing device 10 may recognize the touch as an operation directed at the UI. In this case, if the spot that the user touches is not part of the UI that sets the display state of the shielding image 30, the information processing device 10 recognizes the touch operation performed by the user as an operation directed at the screen 15 of the app underneath the shielding image 30.

As another example, the user may be able to perform an operation in advance to designated to the information processing device 10 whether a touch operation performed on the primary display 14 is directed at the shielding image 30 or directed at the screen 15 of the app underneath. For example, a specific predetermined operation (an operation hardly used in ordinary operation scenarios, such as tapping the screen with three fingers at the same time, for example) may be defined as an operation in advance that gives notice that an operation will be performed with respect to the screen 15 of the app. In the case where the user performs such a specific touch operation, the information processing device 10 enables a mode that receives operations on the screen 15. The information processing device 10 recognizes touch operations performed by the user in this mode as operations with respect to the screen 15 rather than the shielding image 30. Similarly, a specific operation for disabling the mode may also be defined.

Figure 9A:
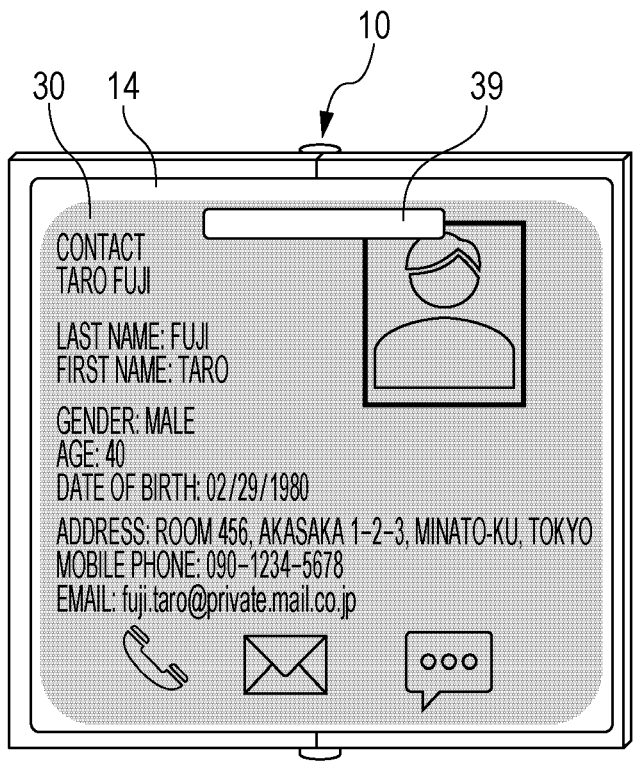
FIGS. 9A and 9B are diagrams illustrating an example of a screen display including an icon that receives an instruction for switching between a mode that receives operations on the shielding image and a mode that receives operations on the screen underneath the shielding image.
Figure 9B:
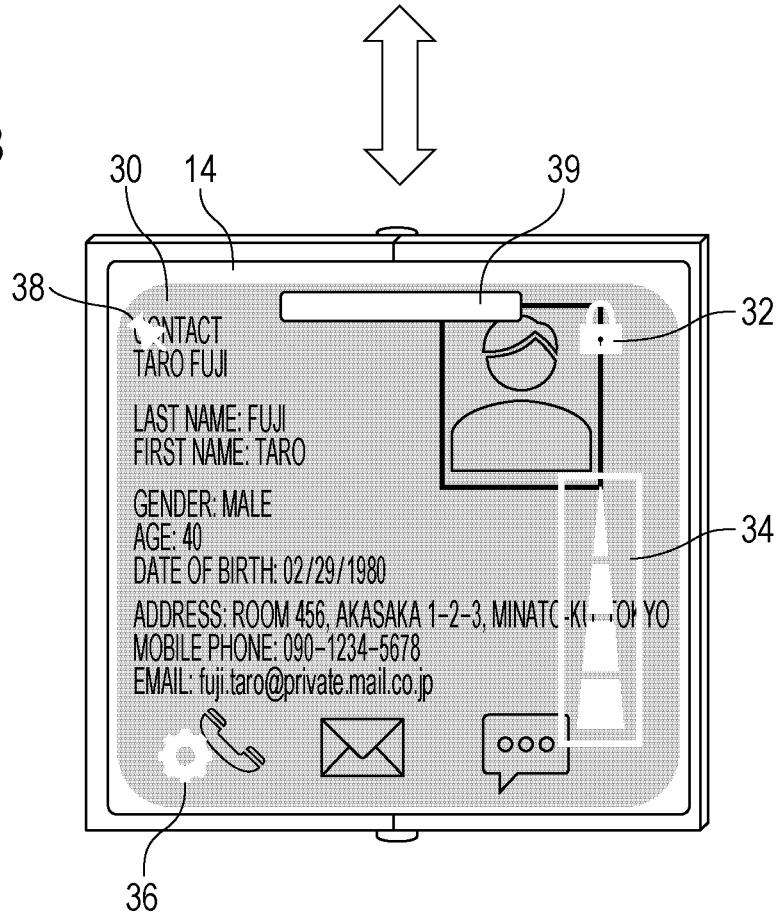

In addition, an operation for toggling such a mode may also be defined as an operation of a type other than a touch operation. For example, a mode toggle icon (not illustrated) may be displayed in the shielding image 30, and the mode may be toggled by having the user tap the icon. In one example, when the shielding image 30 is display initially, an icon 39 for receiving a mode toggle instruction is displayed in the shielding image 30 as illustrated in the example of FIG. 9A, while the other icons 32 to 38 (see FIG. 6) for setting the display of the shielding image 30 are not displayed. In this state, the information processing device 10 is in the mode that receives operations on the screen 15 underneath the shielding image 30. In this mode, if the spot that the user touches is a spot other than the icon 39, the information processing device 10 recognizes the touch operation as an operation directed at the screen 15 of the app underneath the shielding image 30. Also, if the user taps the icon 39 in this state, the information processing device 10 switches to a mode that recognizes operations from the user as operations directed at the shielding image 30. The display state of the screen in this mode is illustrated in FIG. 9B. In the state of FIG. 9B, the other icons 32 to 38 for setting the display of the shielding image 30 are additionally displayed in the shielding image 30. In this state, if the user touches the spot of one of the icons 32 to 38 or performs a predetermined touch operation for moving or changing the size of the shielding image 30, the information processing device 10 recognizes the operation as an operation directed at the shielding image 30. Also, if the user taps the icon 39 in this state, the information processing device 10 returns to the mode in FIG. 9A.

The exemplary embodiment described above is merely for the purpose of illustration and description, and various modifications and alterations are conceivable within the scope of the present disclosure.

For example, when the display mechanism changes from the folded state to the unfolded state, the image to be superimposed onto the screen 15 of the app displayed in the display region of the primary display 14 may be an opaque image instead of the translucent shielding image 30. By making the superimposed image opaque, the risk of the screen 15 being seen by a peeping third party is substantially eliminated. A UI (for example, an icon) for receiving an instruction to remove the image or make the image transparent may also be displayed on the opaque image. If the user taps the icon, the information processing device 10 makes the content of the screen 15 visible to the user by removing the opaque image or by raising the transparency level of the image.

Also, when the display mechanism changes from the folded state to the unfolded state, the information processing device 10 may superimpose a predetermined image already known not to include secret information such as personal information and sensitive information onto the screen 15 of the app displayed in the display region of the primary display 14. Examples of such a predetermined image include a calendar screen generated by a calendar app, a clock screen generated by a clock app, a news screen generated by a news app, and a screen of a specific website preregistered by the user.

Additionally, the foregoing description takes the example of a case in which, when the display mechanism switches from the folded state to the unfolded state, a screen of the same app as the app that had been displayed on the sub-display 16 in the folded state is displayed on the primary display 14. However, this is merely one example. When the display mechanism switches from the folded state to the unfolded state, by superimposing the shielding image 30 even in cases where the screens of one or more different apps preregistered as apps related to the app that had been displayed on the sub-display 16 are displayed in addition to or instead of the app that had been displayed on the sub-display 16, the risk of an information leak is lowered.

Also, in the above examples, the process of shielding the screen 15 displayed in the display region of the primary display 14 performed when the display mechanism switches from the folded state to the unfolded state is a process of covering the screen 15 with the shielding image 30, but this is merely one example. Instead, a process of lowering a property such as the brightness or display contrast of the primary display 14 to a value lower than the value set by the OS may also be adopted as the shielding process, for example.

Also, in the examples described above, more items are displayed on the screen 15 displayed on the primary display 14 compared to the items that had been displayed on the screen 17 of the sub-display 16. However, the control of the foregoing exemplary embodiment is not limited to such a case, and has some value even in cases where the displayed content of the screen 17 is simply an enlargement of the screen 15. For example, in the case of displaying a map generated by a map app, the image displayed on the screen 17 is enlarged and displayed on the screen 15. Because the enlarged display makes it easier for a peeping third party to see the content of the display compared to the display on the screen 17, the shielding process that makes the displayed content harder to see is still considered useful in such a case.

Also, in the examples described above, the information processing device 10 has a foldable display mechanism with the primary display 14 on the inner side of the fold. The inner-folding information processing device 10 includes the sub-display 16 that displays information in the folded state as a display that is physically separate from the primary display 14 that displays information in the unfolded state. However, the technique of the exemplary embodiment is also applicable to an outer-folding information processing device having a foldable display mechanism with the primary display 14 on the outer side of the fold. In the case of an outer-folding display mechanism, in the folded state, the primary display 14 is substantially divided in half with a display region on the front side and a display region on the back side of the folded display mechanism. Of the two front and back display regions, the information processing device treats the display region farther upward in the gravitational direction as the display region viewed by the user for example, and displays a screen in the portion of the primary display 14 corresponding to the upward display region. The portion that displays information at this time corresponds to the first display region where the first screen is displayed in the folded state. When the display mechanism is transformed from the folded state to the unfolded state, information is displayed on the entire primary display 14, and the portion that displays information at this time, or in other words the region of the entire primary display 14, corresponds to the second display region where the second screen is displayed. When the second screen is displayed in the second display region in association with the transformation from the folded state to the unfolded state, the "shielding process" such as displaying the shielding image 30 may also be performed.

Additionally, the technique of the foregoing exemplary embodiment is also applicable to an information processing device having a structure that reduces the area of the large-area primary display 14 corresponding to the second display region displayed in the open state with a method other than a folding method, such as a roll-up method like a scroll, for example. In the case of a device having a structure that rolls up the primary display 14 like a scroll, the state in which the primary display 14 is rolled up corresponds to the closed state, while the state in which the entirety of the unrolled primary display 14 is pulled out and substantially flat corresponds to the open state. In the closed state, information is displayed on the portion of the rolled primary display 14 that is visible from the outside, or on a small display provided on the device separately from the primary display 14. The portion or small display that displays information at this time corresponds to the first display region where the first screen is displayed in the closed state. When the display mechanism changes from the closed state to the open state, a screen is displayed on the entirely pulled-out primary display 14, and in this case, the entire primary display 14 corresponds to the second display region where the second screen is displayed. When the second screen is displayed in the second display region in association with the transformation from the closed state to the open state, the "shielding process" such as displaying the shielding image 30 may also be performed.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    an openable display mechanism that displays a first screen in a first display region in a closed state, and displays a second screen in a second display region having a larger area than the first display region in an open state; and
    a processor configured to:
        execute a display process of displaying more content on the second screen in the open state than on the first screen in the closed state, wherein
        in the closed state, the display process includes displaying first displayed content on the first screen, and
        in the open state, in addition to the first displayed content, the display process includes displaying, on the second screen, second displayed content that had not been displayed on the first screen;
        when the display mechanism is changed from the closed state to the open state, determine whether personal information or secret information is included in the second displayed content that had not been displayed on the first screen; and
        when a determination is made that personal information or secret information is included in the second displayed content that had not been displayed on the first screen, execute a display process of lowering a visibility of at least the second displayed content on the second screen.

2. The information processing device according to claim 1, wherein
    when the display mechanism displaying first displayed content on the first screen in the closed state changes to the open state, the processor is configured to control the display mechanism to display second displayed content that includes the first displayed content on the second screen, and
    the display process of lowering the visibility is a process of lowering the visibility of the second displayed content displayed on the second screen.

3. The information processing device according to claim 2, wherein
    the display process of lowering the visibility is a process of superimposing a first image that lowers the visibility onto the second displayed content displayed on the second screen.

4. The information processing device according to claim 3, wherein
    the first image is a translucent image.

5. The information processing device according to claim 4, wherein
    the processor is configured to recognize a touch operation performed by a user on the second screen onto which the first image is superimposed as an operation directed at a spot treated as a target of the touch operation among the second displayed content visible through the first image.

6. The information processing device according claim 3, wherein
    a setting of a display state of the first image is received by an operation directed at the first image.

7. The information processing device according claim 4, wherein
    a setting of a display state of the first image is received by an operation directed at the first image.

8. The information processing device according claim 5, wherein
    a setting of a display state of the first image is received by an operation directed at the first image.

9. The information processing device according to claim 3, wherein
    the processor is configured to control the first image according to the second displayed content.

10. The information processing device according to claim 4, wherein
    the processor is configured to control the first image according to the second displayed content.

11. The information processing device according to claim 5, wherein
    the processor is configured to control the first image according to the second displayed content.

12. The information processing device according to claim 6, wherein the processor is configured to control the first image according to the second displayed content.

13. The information processing device according to claim 7, wherein
the processor is configured to control the first image according to the second displayed content.

14. The information processing device according to claim 8, wherein
the processor is configured to control the first image according to the second displayed content.

15. The information processing device according to claim 1, wherein
a condition for executing the display process of lowering the visibility is settable, and
when the display mechanism in the closed state changes to the open state, the processor is configured to:
execute the display process of lowering the visibility if the condition is satisfied, and not execute the display process of lowering the visibility if the condition is not satisfied;
receive, from a user, a setting that enables or disables the display process of lowering the visibility; and
in a case where the setting that disables the display process of lowering the visibility is set, not execute the display process of lowering the visibility even if the condition is satisfied.

16. The information processing device according to claim 1, wherein
a condition for executing the display process of lowering the visibility is settable, and
when the display mechanism in the closed state changes to the open state, the processor is configured to:
execute the display process of lowering the visibility if the condition is satisfied, and not execute the display process of lowering the visibility if the condition is not satisfied;
receive, from a user, a setting that enables or disables the display process of lowering the visibility; and
in a case where the setting that disables the display process of lowering the visibility is set, execute a predetermined warning process if the condition is satisfied.

17. The information processing device according to claim 1, wherein
a condition for executing the display process of lowering the visibility is settable,
the processor is configured to, when the display mechanism in the closed state changes to the open state, execute the display process of lowering the visibility if the condition is satisfied, and not execute the display process of lowering the visibility if the condition is not satisfied, and
the condition stipulates whether or not to execute the display process of lowering the visibility based on at least one of:
(i) a location of the information processing device;
(ii) an application program displayed on the first screen in the closed state;
(iii) a type of communication;
(iv) whether a person other than a user of the information processing device is present around the information processing device; and
(v) whether personal or secret information is included among content displayed on a screen.

18. A non-transitory computer readable medium storing a program causing a computer to execute a process for processing information, the computer being provided with
an openable display mechanism that displays a first screen in a first display region in a closed state, and displays a second screen in a second display region having a larger area than the first display region in an open state,
the process comprising:
executing a display process of displaying more content on the second screen in the open state than on the first screen in the closed state, wherein
in the closed state, the display process includes displaying first displayed content on the first screen, and
in the open state, in addition to the first displayed content, the display process includes displaying, on the second screen, second displayed content that had not been displayed on the first screen;
when the display mechanism is changed from the closed state to the open state, determining whether personal information or secret information is included in the second displayed content that had not been displayed on the first screen; and
when a determination is made that personal information or secret information is included in the second displayed content that had not been displayed on the first screen, executing a display process of lowering a visibility of at least the second displayed content on the second screen.

19. The non-transitory computer readable medium storing a program according to claim 18, wherein
a condition for executing the display process of lowering the visibility is settable,
the process comprises, when the display mechanism in the closed state changes to the open state, executing the display process of lowering the visibility if the condition is satisfied, and not executing the display process of lowering the visibility if the condition is not satisfied, and
the condition stipulates whether or not to execute the display process of lowering the visibility based on at least one of:
(i) a location of the computer;
(ii) an application program displayed on the first screen in the closed state;
(iii) a type of communication;
(iv) whether a person other than a user of the computer is present around the computer; and
(v) whether personal or secret information is included among content displayed on a screen.

* * * * *